United States Patent
Tomczak (10) Patent No.: US 9,697,516 B2
(45) Date of Patent: Jul. 4, 2017

(54) SYSTEM, METHODS, AND COMPUTER PROGRAM PRODUCTS FOR STORING AND MANAGING PROGRAM DATA

(71) Applicant: GOOGLE INC., Mountain View, CA (US)

(72) Inventor: Christopher J. Tomczak, Allen, TX (US)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 14/492,209

(22) Filed: Sep. 22, 2014

(65) Prior Publication Data

US 2015/0102915 A1    Apr. 16, 2015

Related U.S. Application Data

(60) Provisional application No. 61/889,238, filed on Oct. 10, 2013.

(51) Int. Cl.
| | | |
|---|---|---|
| G06K 7/10 | (2006.01) | |
| G06Q 20/32 | (2012.01) | |
| H04L 29/06 | (2006.01) | |

(52) U.S. Cl.
CPC ..... *G06Q 20/3278* (2013.01); *G06Q 20/3227* (2013.01); *H04L 63/0853* (2013.01)

(58) Field of Classification Search
CPC .......... G06Q 20/3221; G06Q 20/3223; G06Q 20/3227; G06Q 20/327; G06Q 20/3278;
(Continued)

(56) References Cited

U.S. PATENT DOCUMENTS

| 5,590,038 A | 12/1996 | Pitroda ......................... 395/241 |
| 5,640,002 A | 6/1997 | Ruppert et al. ............... 235/472 |

(Continued)

FOREIGN PATENT DOCUMENTS

| CA | 2 381 614 A1 | 3/2001 |
| EP | 1 222 503 A2 | 7/2002 |

(Continued)

OTHER PUBLICATIONS

Int'l Search Report and Written Opinion issued in connection with Int'l Appl'n No. PCT/US2014/056719 on Dec. 12, 2014 (11 pages).

(Continued)

*Primary Examiner* — Joseph Feild
*Assistant Examiner* — Yong Hang Jiang
(74) *Attorney, Agent, or Firm* — Johnson, Marcou & Isaacs, LLC (57) ABSTRACT

Systems, methods, and computer program products are provided for storing and managing program data. A service provider ID having both generic and specific components is sent from a terminal to a mobile device. The mobile device determines whether the service provider ID sent from the terminal matches a service provider ID stored on the mobile device. If there is a match, the mobile device transmits, to the terminal, program data stored on the mobile device associated with the matched service provider ID. If no match is determined, the mobile device determines whether the generic component of the service provider ID sent from the terminal matches the generic component of a service provider ID stored on the mobile device. If there is a generic match, the mobile device transmits, to the terminal, program data stored on the mobile device associated with the generically matched service provider ID.

17 Claims, 4 Drawing Sheets

(58) Field of Classification Search
CPC .. G06Q 20/34; G06Q 20/341; G06Q 20/3415; G06Q 20/343; G06Q 20/3433; G06Q 20/346; G06Q 20/347; G06Q 20/349; G06Q 20/351; G06Q 20/352; G06Q 20/356; G06Q 20/3563

USPC ... 340/10.1, 10.2, 10.3, 10.31, 10.32, 10.33, 340/10.34, 10.4, 10.41, 10.42, 10.5, 340/10.51, 10.52

See application file for complete search history.

(56) References Cited

U.S. PATENT DOCUMENTS

| | | | |
|---|---|---|---|
| 5,748,740 A | 5/1998 | Curry et al. | 380/25 |
| 5,805,702 A | 9/1998 | Curry et al. | 380/24 |
| 5,884,271 A | 3/1999 | Pitroda | 705/1 |
| 5,901,303 A | 5/1999 | Chew | 395/400 |
| 5,940,510 A | 8/1999 | Curry et al. | 380/25 |
| 5,949,880 A | 9/1999 | Curry et al. | 380/24 |
| 6,073,840 A | 6/2000 | Marion | 235/381 |
| 6,105,013 A | 8/2000 | Curry et al. | 705/65 |
| 6,116,505 A | 9/2000 | Withrow | 235/381 |
| 6,131,811 A | 10/2000 | Gangi | 235/380 |
| 6,237,095 B1 | 5/2001 | Curry et al. | 713/178 |
| 6,422,464 B1 | 7/2002 | Terranova | 235/384 |
| 6,587,835 B1 | 7/2003 | Treyz et al. | 705/14 |
| 6,601,759 B2 | 8/2003 | Fife et al. | 235/375 |
| 6,671,358 B1 | 12/2003 | Seidman et al. | 379/93.12 |
| 6,732,081 B2 | 5/2004 | Nicholson | 705/14 |
| 6,769,607 B1 | 8/2004 | Pitroda et al. | 235/380 |
| 6,813,609 B2 | 11/2004 | Wilson | 705/14 |
| 6,837,436 B2 | 1/2005 | Swartz et al. | 235/472.02 |
| 6,925,439 B1 | 8/2005 | Pitroda | 705/1 |
| 7,083,094 B2 | 8/2006 | Cooper | 235/449 |
| 7,110,792 B2 | 9/2006 | Rosenberg | 455/558 |
| 7,127,236 B2 | 10/2006 | Khan et al. | 455/414.1 |
| 7,155,405 B2 | 12/2006 | Petrovich | 705/26 |
| 7,194,422 B1 | 3/2007 | St. John Killick | 705/14 |
| 7,216,109 B1 | 5/2007 | Donner | 705/64 |
| 7,249,112 B2 | 7/2007 | Berardi et al. | 705/79 |
| 7,286,818 B2 | 10/2007 | Rosenberg | 455/414.1 |
| 7,298,271 B2 | 11/2007 | Sprogis | 340/572.1 |
| 7,308,426 B1 | 12/2007 | Pitroda | 705/35 |
| 7,330,714 B2 | 2/2008 | Rosenberg | 455/412.1 |
| 7,349,885 B2 | 3/2008 | Gangi | 705/41 |
| 7,469,151 B2 | 12/2008 | Khan et al. | 455/558 |
| 7,469,381 B2 | 12/2008 | Ording | 715/702 |
| 7,483,858 B2 | 1/2009 | Foran et al. | 705/39 |
| 7,494,055 B2 | 2/2009 | Fernandes et al. | 235/380 |
| 7,529,563 B1 | 5/2009 | Pitroda | 455/558 |
| 7,571,139 B1 | 8/2009 | Giordano et al. | 705/40 |
| 7,581,678 B2 | 9/2009 | Narendra et al. | 235/451 |
| 7,613,628 B2 | 11/2009 | Ariff et al. | 705/14 |
| 7,631,810 B2 | 12/2009 | Liu et al. | 235/451 |
| 7,693,752 B2 | 4/2010 | Jaramillo | 705/26 |
| 7,708,198 B2 | 5/2010 | Gangi | 235/380 |
| 7,712,658 B2 | 5/2010 | Gangi | 235/380 |
| 7,775,430 B2 | 8/2010 | Lin | 235/383 |
| 7,805,615 B2 | 9/2010 | Narendra et al. | 713/186 |
| 7,828,214 B2 | 11/2010 | Narendra et al. | 235/451 |
| 7,856,377 B2 | 12/2010 | Cohagan et al. | 705/14.3 |
| 7,864,163 B2 | 1/2011 | Ording et al. | 345/173 |
| 7,942,337 B2 | 5/2011 | Jain | 235/492 |
| 7,954,715 B2 | 6/2011 | Narendra et al. | 235/451 |
| 7,954,716 B2 | 6/2011 | Narendra et al. | 235/451 |
| 7,954,717 B2 | 6/2011 | Narendra et al. | 235/451 |
| 7,961,101 B2 | 6/2011 | Narendra et al. | 340/572.1 |
| 7,967,215 B2 | 6/2011 | Kumar et al. | 235/492 |
| 7,991,158 B2 | 8/2011 | Narendra et al. | 380/260 |
| 8,072,331 B2 | 12/2011 | Narendra et al. | 340/572.1 |
| 8,083,145 B2 | 12/2011 | Narendra et al. | 235/451 |
| 8,091,786 B2 | 1/2012 | Narendra et al. | 235/451 |
| 8,131,645 B2 | 3/2012 | Lin et al. | 705/51 |
| 8,140,418 B1 | 3/2012 | Casey et al. | 705/35 |
| 8,396,808 B2 | 3/2013 | Greenspan | 705/64 |
| 8,429,046 B2 | 4/2013 | Pitroda | 705/35 |
| 2002/0049631 A1 | 4/2002 | Williams | 705/14 |
| 2002/0082921 A1 | 6/2002 | Rankin | 705/14 |
| 2002/0174025 A1 | 11/2002 | Hind et al. | 705/26 |
| 2002/0179703 A1 | 12/2002 | Allen | 235/381 |
| 2003/0009382 A1 | 1/2003 | D'Arbeloff et al. | 705/17 |
| 2003/0083042 A1 | 5/2003 | Abuhamdeh | 455/406 |
| 2003/0115126 A1 | 6/2003 | Pitroda | 705/36 |
| 2003/0132298 A1 | 7/2003 | Swartz et al. | 235/472.02 |
| 2003/0200489 A1 | 10/2003 | Hars | 714/703 |
| 2003/0229900 A1* | 12/2003 | Reisman | G06F 17/30873 725/87 |
| 2004/0073519 A1 | 4/2004 | Fast | 705/65 |
| 2004/0186768 A1 | 9/2004 | Wakim et al. | 705/14 |
| 2005/0004866 A1 | 1/2005 | Bonalle et al. | 705/39 |
| 2005/0063541 A1* | 3/2005 | Candelore | H04N 7/165 380/239 |
| 2005/0068152 A1* | 3/2005 | Umehara et al. | 340/5.8 |
| 2005/0081040 A1* | 4/2005 | Johnson | G06F 21/32 713/176 |
| 2005/0171898 A1 | 8/2005 | Bishop et al. | 705/39 |
| 2005/0188360 A1* | 8/2005 | de Jong | 717/136 |
| 2005/0222961 A1 | 10/2005 | Staib et al. | 705/64 |
| 2005/0234769 A1 | 10/2005 | Jain et al. | 705/14 |
| 2005/0247777 A1 | 11/2005 | Pitroda | 235/380 |
| 2006/0004858 A1* | 1/2006 | Tran et al. | 707/104.1 |
| 2006/0287004 A1 | 12/2006 | Fuqua | 455/558 |
| 2007/0014407 A1 | 1/2007 | Narendra et al. | 380/259 |
| 2007/0014408 A1 | 1/2007 | Narendra et al. | 380/270 |
| 2007/0180450 A1* | 8/2007 | Croft | G06F 3/1415 718/1 |
| 2007/0198432 A1 | 8/2007 | Pitroda et al. | 705/64 |
| 2008/0306849 A1 | 12/2008 | Johnson, Jr. et al. | 705/35 |
| 2009/0108064 A1 | 4/2009 | Fernandes et al. | 235/380 |
| 2009/0164322 A1 | 6/2009 | Khan et al. | 705/14 |
| 2010/0241494 A1 | 9/2010 | Kumar et al. | 705/14.1 |
| 2011/0073663 A1 | 3/2011 | Narendra et al. | 235/492 |
| 2011/0171996 A1 | 7/2011 | Narendra et al. | 455/558 |
| 2011/0223972 A1 | 9/2011 | Narendra et al. | 455/558 |
| 2011/0231238 A1 | 9/2011 | Khan et al. | 705/14.26 |
| 2011/0244796 A1 | 10/2011 | Khan et al. | 455/41.1 |
| 2011/0269438 A1 | 11/2011 | Narendra et al. | 455/414.1 |
| 2011/0271044 A1 | 11/2011 | Narendra et al. | 711/103 |
| 2011/0272468 A1 | 11/2011 | Narendra et al. | 235/492 |
| 2011/0272469 A1 | 11/2011 | Narendra et al. | 235/492 |
| 2012/0064828 A1 | 3/2012 | Khan et al. | 455/41.1 |
| 2012/0109764 A1 | 5/2012 | Martin et al. | 705/17 |
| 2012/0323664 A1 | 12/2012 | Klems | 705/14.26 |
| 2013/0317927 A1* | 11/2013 | Bush et al. | 705/21 |

FOREIGN PATENT DOCUMENTS

| | | |
|---|---|---|
| EP | 0 766 852 B1 | 8/2004 |
| EP | 1 412 890 A4 | 11/2004 |
| EP | 1 477 943 A2 | 11/2004 |
| WO | WO 01/18629 A3 | 3/2001 |
| WO | WO 03/012717 A1 | 2/2003 |
| WO | 2015/053924 A1 | 4/2015 |

OTHER PUBLICATIONS

Moussaid, "International Preliminary Report on Patentability issued in International Application No. PCT/US2014/056719", mailed on Apr. 21, 2016, 7 pages.

* cited by examiner

SYSTEM, METHODS, AND COMPUTER PROGRAM PRODUCTS FOR STORING AND MANAGING PROGRAM DATA

CROSS REFERENCE TO RELATED APPLICATION

This application claims priority to U.S. Provisional Application No. 61/889,238, filed Oct. 10, 2013, the contents of which are incorporated herein by reference.

BACKGROUND

Field

The present invention relates to program data associated with service providers, and more particularly to systems, methods, and computer program products for storing and managing said program data.

Related Art

A service provider is a company, organization, entity, or the like, that provides services to consumers. Examples of service providers include entities such as merchants, retail stores, membership clubs, card associations, banks, marketing companies, and transit authorities. A service can be in the form of an activity, capability, functionality, work, or use. Specific examples of services include payment services, ticketing services, offer or loyalty services, transit pass services, and the like. A consumer may use a service via a mobile device, for example, by utilizing one or more mobile software applications that enable that service.

A mobile device enables a service through a transaction, an exchange of information between the mobile device and the service provider. Transactions involving mobile devices commonly relate to payment services and may involve the exchange of payment information and/or commerce information. Payment information is information that enables a consumer to make a payment for a service or product. Examples include credit card numbers, bank account information, virtual currency information, and the like. Commerce information is information other than payment information that affects a payment and/or contactless transaction, such as a coupon, promotional code, credit, gift voucher, loyalty information, and the like.

Transactions involving mobile devices and service providers, including those involving payment services, often require a mobile device to interface with a terminal such as a point of sale system, reader terminal, scanner, wireless hotspot, or the like. A terminal is associated with a service provider and may be located at a service provider's brick and mortar location.

It is common for mobile devices to perform contactless transactions with the terminal. Contactless transactions are transactions in which information exchange occurs between the mobile device and the terminal when they are positioned within certain proximity of each other, generally less than ten centimeters apart. Contactless transactions are made possible by standards-based wireless communication technologies, one common example being near field communications (NFC) technology.

In a mobile environment involving transactions between mobile devices and service providers, service providers may issue program data to the mobile devices to enable the mobile devices to perform the transactions.

Program data is information that enables, authorizes, augments or otherwise affects the use of a service. In the context of payment services, program data includes commerce information such as the above-mentioned coupons, promotional codes, credits, and the like. Other examples of program data may include user identifiers, access credentials, membership information, loyalty information, eligibility or subscription status, points, and the like.

For example, a store may allow for contactless commerce and/or payment transactions to enable a customer to pay for goods sold at the store using a mobile device. That same store may offer a loyalty program service in which customers, for example, are rewarded with discounts on goods when making a payment. In order to enable the loyalty program service, the store may issue program data to be stored on the customer's mobile device, in this case as commerce information in the form of a loyalty number. A contactless transaction may then involve the exchange of one or both the loyalty number and payment information (e.g., a credit card number) between the mobile device and a point-of-sale (POS) terminal at one of the store's brick and mortar locations.

Service providers often operate under several different names or entities. For example, a parent company (e.g., Company X) may own and operate several different stores with different brand names (e.g., Brand A Store, Brand B Store and Brand C Store). The parent company may provide the same services (e.g., loyalty program) at each of its branded stores. Also, each branded store may provide its own unique services (e.g., loyalty program). In many instances, a consumer may not be aware of the fact that a branded store falls under a common parent company or that two different branded stores provide compatible services. For example, each branded store operating under Company X may offer its own loyalty membership in addition to accepting loyalty memberships provided by any of the other Company X operated stores. A consumer may not be aware of the fact that it is possible to use a loyalty membership number for a Brand A store in a transaction at a Brand B store. As such, requiring a user to determine which program data applies to a given service and/or requiring a user to manually elect to apply program data to services can often result in missed opportunities to enable or affect a service. Thus, there is a need to automatically apply program data to compatible or associated service providers.

Typically, in order to apply compatible program data to a transaction (e.g., program data that is associated with and/or may be used by the service provider with which a transaction is being made), a mobile device receives a service provider identifier (ID) from the terminal and determines whether or not program data stored on the mobile device matches or is associated with the service provider ID. Using such an approach to apply compatible program data to a transaction requires several processing steps to be executed by the mobile device and terminal. Alternatively, if the mobile device transmits all compatible program data to the terminal, additional processing is required by the mobile device and terminal to collect and subsequently determine which program data to apply to a transaction. In instances where the mobile device stores large volumes of program data, such additional processing can result in significant delays in transaction times and can diminish usability.

Thus, one technical challenge involves minimizing the transaction time and resources required to identifying compatible program data among multiple sets of program data stored on a mobile device and to applying that compatible program data to a transaction without the need for manual end-user input. There is a need, therefore, for systems, methods and computer program products for identifying and matching program data to service provider IDs that utilize a condensed format service provider ID having both generic and specific components.

BRIEF DESCRIPTION

The example embodiments presented herein meet the above-identified needs by providing systems, methods, and computer program products for storing and managing program data.

In one embodiment, a system for storing and managing program data includes a processor coupled to a memory. The memory is operable to store program data, the program data including one or more program IDs each associated with one or more service provider IDs, each service provider ID having a generic component and a specific component. The processor receives, from a reader terminal, a first service provider ID, the first service provider ID having a first generic component and a first specific component and a determination is made whether the first service provider ID matches one of the one or more service provider IDs stored in the memory. If it is determined that the first service provider ID matches one of the one or more service provider IDs stored in the memory, the one or more program IDs associated with the one or more service provider IDs that match the first service provider ID are transmitted to the reader terminal. If it is determined that the first service provider ID does not match one of the one or more service provider IDs stored in the memory, the processor further determines whether the first generic component of the first service provider ID matches the generic component of the one or more service provider IDs stored in the memory. If it is determined both that that the first service provider ID does not match one of the one or more service provider IDs stored in the memory and the first generic component of the first service provider ID matches the generic component of the one or more service provider IDs stored in the memory, the processor transmits, to the reader terminal, the one or more program IDs associated with the one or more service provider IDs having a generic component that matches the first generic component of the first service provider ID.

In another embodiment, a method for storing and managing program data includes storing program data in a memory, the program data including one or more program IDs each associated with one or more service provider IDs, each service provider ID having a generic component and a specific component; receiving, from a reader terminal, a first service provider ID, the first service provider ID having a first generic component and a first specific component; and determining whether the first service provider ID matches one of the one or more service provider IDs stored in the memory. In the event that the first service provider ID matches one of the one or more service provider IDs stored in the memory, the one or more program IDs associated with the one or more service provider IDs that match the first service provider ID are transmitted to the reader terminal. In the event that the first service provider ID does not match one of the one or more service provider IDs stored in the memory, it is determined whether the first generic component of the first service provider ID matches the generic component of the one or more service provider IDs stored in the memory. In the event that the first service provider ID does not match one of the one or more service provider IDs stored in the memory and in the event that the first generic component of the first service provider ID matches the generic component of the one or more service provider IDs stored in the memory, the one or more program IDs associated with the one or more service provider IDs having a generic component that matches the first generic component of the first service provider ID are transmitted to the reader terminal.

In still another embodiment, a non-transitory computer-readable medium has stored thereon sequences of instructions, the sequences of instructions including instructions, which, when executed by a computer system cause the computer to: store program data in a memory, the program data including one or more program IDs each associated with one or more service provider IDs, each service provider ID having a generic component and a specific component; receive, from a reader terminal, a first service provider ID, the first service provider ID having a first generic component and a first specific component; determine whether the first service provider ID matches one of the one or more service provider IDs stored in the memory; transmit, to the reader terminal, in the event that the first service provider ID matches one of the one or more service provider IDs stored in the memory, the one or more program IDs associated with the one or more service provider IDs that match the first service provider ID; determine, in the event that the first service provider ID does not match one of the one or more service provider IDs stored in the memory, whether the first generic component of the first service provider ID matches the generic component of the one or more service provider IDs stored in the memory; and transmit, to the reader terminal, in the event that the first service provider ID does not match one of the one or more service provider IDs stored in the memory and in the event that the first generic component of the first service provider ID matches the generic component of the one or more service provider IDs stored in the memory, the one or more program IDs associated with the one or more service provider IDs having a generic component that matches the first generic component of the first service provider ID.

BRIEF DESCRIPTION OF THE DRAWINGS

The features and advantages of the present invention will become more apparent from the detailed description set forth below when taken in conjunction with the following drawings.

DETAILED DESCRIPTION

Overview

The example embodiments presented herein are directed to program data associated with service providers, and more particularly to systems, methods, and computer program products for storing and managing said program data.

A service provider ID having both generic and specific components is sent from a terminal to a mobile device. The mobile device determines whether the service provider ID sent from the terminal matches a service provider ID stored on the mobile device. If there is such a match, the mobile device transmits, to the terminal, program data stored on the mobile device associated with the matched service provider ID. If no match is determined, the mobile device determines whether the generic component of the service provider ID sent from the terminal matches the generic component of a service provider ID stored on the mobile device. If there is such a generic match, the mobile device transmits, to the terminal, program data stored on the mobile device associated with the generically matched service provider ID.

The features discussed above are described in further detail below, with reference to FIGS. 1-4.

System

Figure 1:
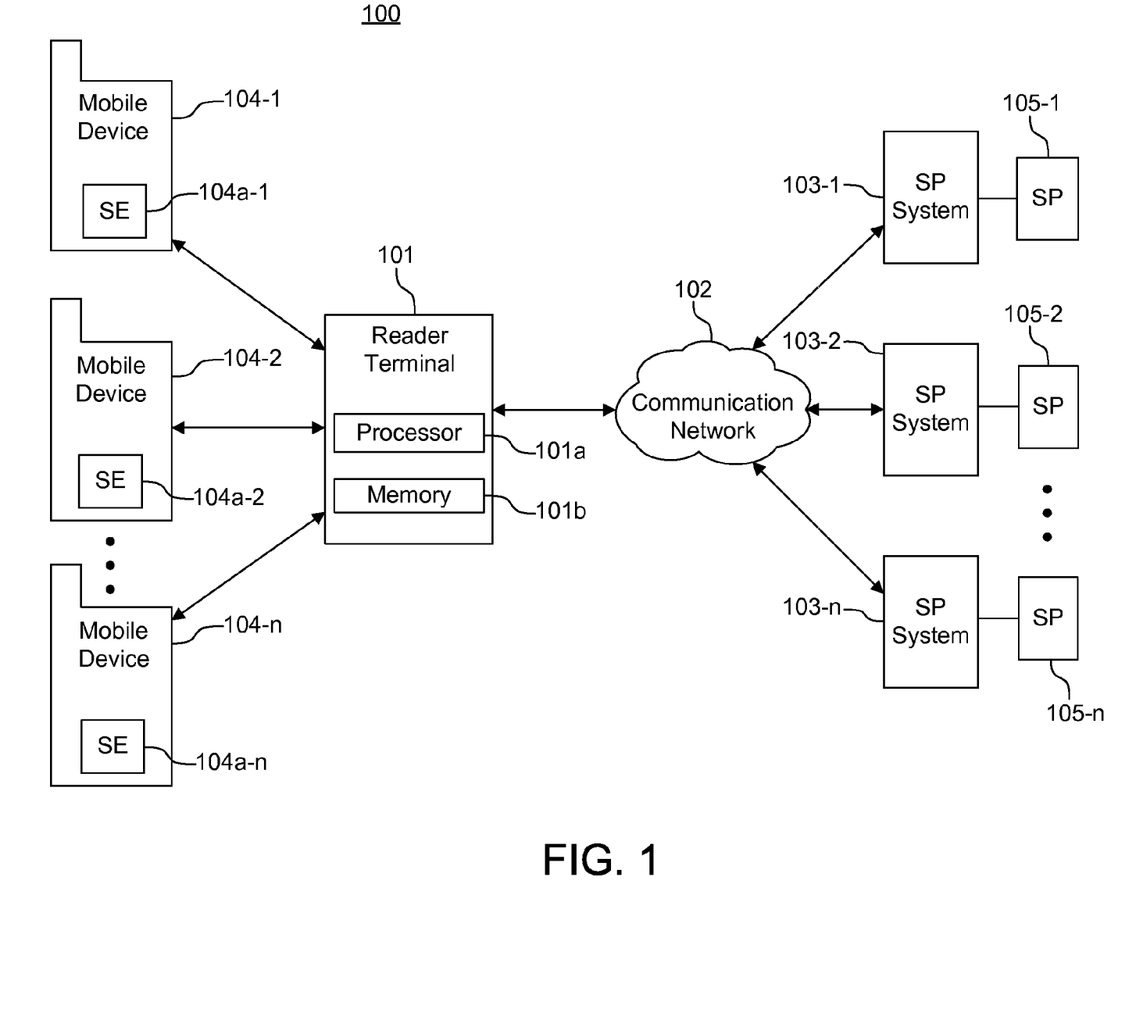
FIG. 1 is a diagram of a mobile commerce system for storing and managing program data according to an exemplary embodiment.

FIG. 1 is a diagram of an example mobile commerce system 100. The system allows service providers to efficiently communicate with mobile devices over a mobile network in order to transact a service. As shown in FIG. 1, system 100 includes service provider systems ("SP systems") 103-1. 103-2, . . . , 103-n (collectively "103"). Each of the SP systems 103 corresponds to a service provider 105-1, 105-2, . . . , 105-n (collectively "105"). A service provider 105 is an entity that provides one or more services to a user through one or more applications, applets, codes, or packages stored on a user's mobile device and/or a secure element on the mobile device. Each SP system 103 serves as an intermediary between a single service provider 105 and other entities including computers, mobile devices, secure elements, mobile network operators, and other SP systems. Service providers 105, however, may be associated with each other by offering compatible services or sharing program data.

Through a corresponding SP system 103, a service provider 105 can provide applications, data or instructions regarding a service to a reader terminal 101 or receive data or instructions from the reader terminal 101. As such, an SP system 103 is communicatively coupled to a reader terminal 101 via a communications network 102. A communications network 102 may be a virtual private network (VPN, a network using Transfer Control Protocol (TCP)/Internet Protocol (IP) standards (e.g. Hypertext Transfer Protocol (HTTP) standards), or the like. An SP system 103 and the reader terminal 101 may also secure these communications by using security protocols such as Secure Socket Layer (SSL), Transport Layer Security (TLS), or the like. An SP system 103 may also communicate with the reader terminal 101 by using an application programming interface (API) such as a web service API.

In an exemplary embodiment, the reader terminal 101 includes a processor 101a and a memory 101b. The reader terminal 101 includes software stored on the memory 101b that performs transactions involving the exchange of data between the mobile device 104 and the communicatively coupled SP system 103. As a result the reader terminal 101 functions as an intermediary between the SP system 103 and the mobile devices 104-1, 104-2, . . . , 104-n (collectively "104") and/or the secure elements 104a-1, 104a-2, . . . , 104a-n (collectively "104a") on the mobile devices 104. Secure elements 104a may be hardware and/or software implemented to store sensitive information and/or code applets, applications and packages. Physically, the secure element may be implemented as a universal integrated circuit card, an embedded secure element, or a micro secure digital (micro SD) card. Alternatively, the secure element may be implemented as a secure storage communicatively connected to the mobile device. For example, such a secure element may be cloud-based, virtual or remote storage.

The reader terminal is communicatively coupled to the secure elements 104a via mobile communication networks. Example mobile networks include mobile phone cellular networks, radio networks, near field communication networks, Bluetooth wireless, or the like. The reader terminal 101 may communicate with the secure elements 104a, via the mobile networks using security protocols such as Global Platform secure channel protocol, SSL, TLS, or the like. In some embodiments, the reader terminal 101 may also include one or more physical interfaces for interfacing with a user or mobile device 104 such as a display, keyboard, scanner, touchscreen, or the like.

As noted above, the secure elements 104a are associated with corresponding mobile devices 104. The secure elements 104a may be communicatively coupled to one or more processors and one or more memories, for example, of their respective mobile devices 104.

As further discussed above, the secure elements 104a may include code, applets, applications, and packages. These items may be provided by service providers 105, mobile network operators, or a system administrator, and may be preloaded on the secure element 104a at the time of manufacture. Packages may include uninstantiated applets and/or applications, and may be loaded on the secure element 104a, for example, over-the-air (OTA). Applets and/or applications on the secure element 104a may also be in uninstantiated or instantiated form. Uninstantiated applets and/or applications may be loaded on the secure element 104a and later instantiated to create one or more instances of said applet and/or application. In addition, applets and/or applications may be loaded, for example, OTA after the secure element 104a has been manufactured (e.g., after delivering the secure element 104a to a user).

An application, applet, package, or code, when executed by a processor causes the mobile device 104 to perform a corresponding service (e.g., make a payment, receive a coupon, or receive an advertisement, etc.).

The secure elements 104a may also store program data. As noted above, program data is data that enables, authorizes, augments or otherwise affects the execution of an application, applet, package or code and in turn the performance of a corresponding service. Program data may be, for example, user identifiers, access credentials, membership data, loyalty information, eligibility or subscription status, credits, points, and the like.

In an exemplary embodiment, program data is stored on the memory of the mobile devices 104 or the secure elements 104a, and is associated with a corresponding unique program ID. A program ID may be a name, number, password, or the like. Each program ID is stored in association with a corresponding service provider ID corresponding to one of the service providers 105. Table 1 illustrates an example database for storing program data in a memory of a mobile device and/or secure element.

TABLE 1

| Program ID | Service Provider ID | Service Provider Name |
|---|---|---|
| 6309472355 | 000AA0100000102 | Store A |
| 2046129566 | 000AA0100000145 | Store B |
| 5882300789 | 000AA0100000223 | Store C |
| 7145402211 | 000AA0100000798 | Store D |

In an exemplary embodiment, a service provider ID may have both a generic and a specific component to allow the service provider ID, for example, to have both generic and specific associations with the service providers 105. For example, the generic component may correspond to an enterprise (e.g., a parent company, parent brand, subsidiary, affiliate, or umbrella corporation) whereas the specific component may correspond to a specific brand within that enterprise (e.g., a specific retail chain, store, or merchant related to or owned by an enterprise).

In an exemplary embodiment, the generic component is encoded in a first set of consecutive bytes in the service provider ID, while the specific component is encoded in a second set of consecutive bytes in the service provider ID. For example, a generic component associated with an enterprise may be encoded in the first 4 consecutive bytes of a service provider ID (e.g., as a generic "header") while a specific component associated with a brand or sub-brand may be encoded in the subsequent 4 consecutive bytes of the service provider ID, so as to generate a full 8 byte service provider ID. Such an exemplary format would allow for more than four billion (4,294,967,295) enterprises and the same number of brands per enterprise to be represented by 8 byte service provider IDs. It should be understood that a service provider ID may be made up of any number of bytes. Table 2 is a data map or table illustrating an exemplary 8 byte service provider ID.

TABLE 2

| Data Bytes | Description |
| --- | --- |
| XX XX XX XX | Generic (e.g., "Enterprise") Component |
| YY YY YY YY | Specific (e.g., "Brand") Component |

Table 3 illustrates service provider IDs for two branded stores that are under a single enterprise company according to an exemplary embodiment.

TABLE 3

| Enterprise (Parent) Company | 4-byte Generic Component | Branded (Child) Store | 4-byte Specific Component | 8-byte Service Provider ID for Branded Store |
| --- | --- | --- | --- | --- |
| Company X | 00 00 AA 01 | Store A | 00 00 01 02 | 00 00 AA 01 00 00 01 02 |
| Company X | 00 00 AA 01 | Store B | 00 00 01 44 | 00 00 AA 01 00 00 01 44 |

As shown in Table 3, an exemplary 8 byte service provider ID is associated with branded Store A and branded Store B. However, each service provider ID also has a generic component (e.g. header) "00 00 AA 01" encoded in its first four consecutive bytes associated with the parent company of Store A and Store B (i.e., Company X). Accordingly, a determination can be made as to the compatibility of loyalty program data between Store A and Store B as well as any other store operating under Company X that has a service provider ID having the same generic component.

The use of service provider IDs having both generic and specific components allows for a service provider 104 to communicate with the secure elements 104 via the reader terminal 101 and make a determination as to whether program data stored in a secure element is compatible with a service transaction offered by the service provider 104. This process is illustrated in FIGS. 2 and 3.

Process

Figure 2:
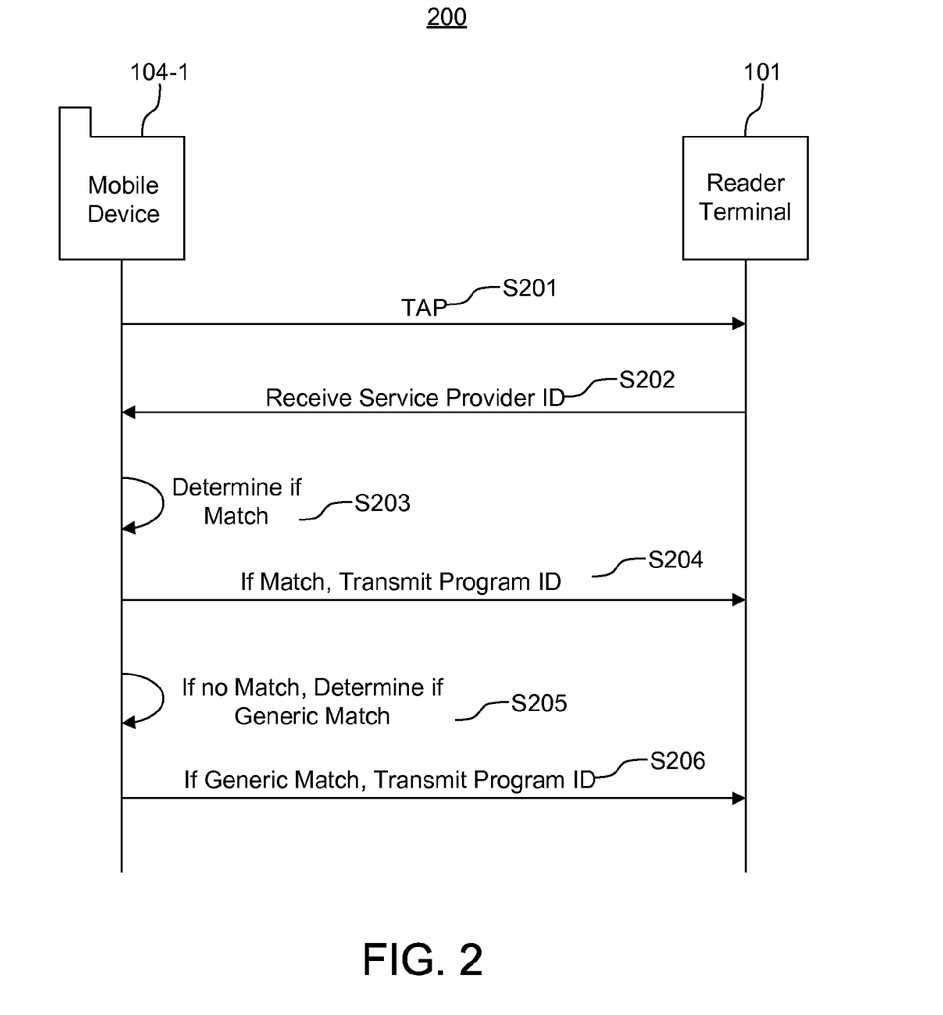
FIG. 2 is a sequence diagram illustrating a process for storing and managing program data according to an exemplary embodiment.
Figure 3:
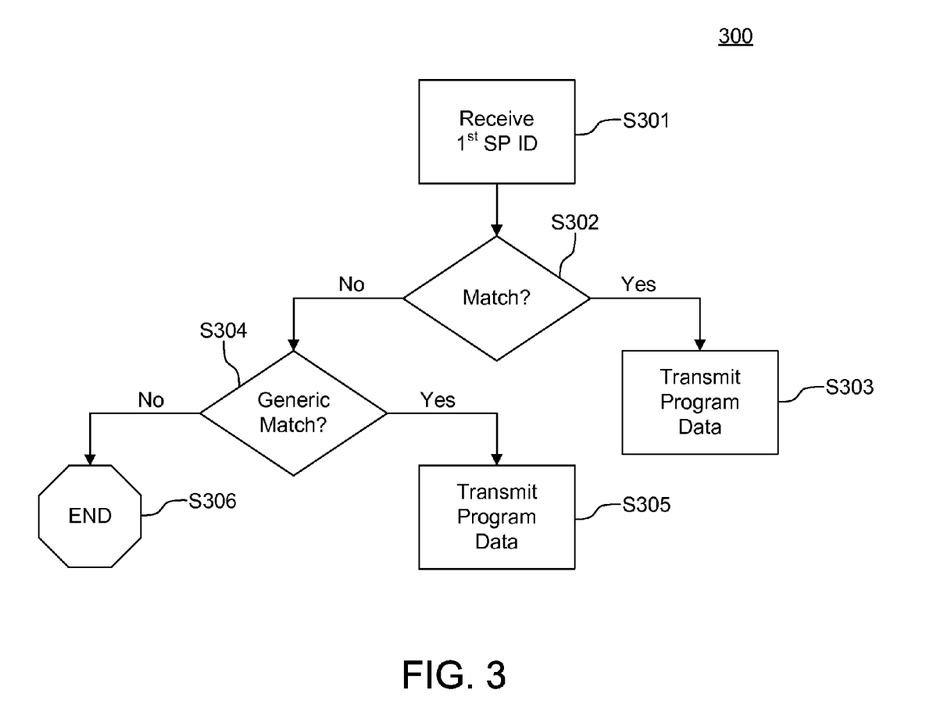
FIG. 3 is a flowchart illustrating the steps for storing and managing program data according to an exemplary embodiment.

FIG. 2 illustrates a sequence diagram 200 for identifying and communicating a program ID from a mobile device (e.g., FIG. 1, mobile device 104-1) to a reader terminal (e.g., FIG. 1, reader terminal 101) according to an exemplary embodiment.

As shown in in FIG. 2, a "tap" is performed to initiate a transaction (e.g., payment, commerce) between the secure element 104 and the reader terminal 101, for example, by way of a network communication, wireless signal, physical contact, or the like). A tap occurs when the mobile device is placed within a predetermined required proximity of the reader terminal 101 such that the two are communicatively coupled via NFC or any other wireless communication technology. During the transaction, the reader terminal 101 sends a service provider ID having both a generic and specific component to the mobile device 104 (S202).

The mobile device 104, in turn, determines whether or not the service provider ID received from the reader terminal 101 matches one of the service provider IDs stored in the mobile device 104 (S203). Specifically, a match occurs when the service provider ID received from the reader terminal 101 has both generic and specific components equal to the generic and specific components of a service provider ID stored on the mobile device.

If the result of the determination is that the service provider ID sent from the reader terminal 101 matches one of the service provider IDs stored on the mobile device 104, the mobile device 104, in turn, identifies one or more program IDs stored on the mobile device 104 that are associated with the received service provider ID. The mobile device 104 transmits to the reader terminal 101 the one or more program IDs identified by the mobile device 104 as being associated with the received service provider ID (S204).

If a determination is made at S203 that there is no match between the service provider ID sent from the reader terminal 101 and any of the service provider IDs stored on the mobile device 104, a second determination is made by the mobile device 104 (S205).

In the second determination, the mobile device 104 determines, whether the generic component of the service provider ID sent from the reader terminal ID 101 matches the generic component of the service provider IDs stored in the mobile device 104 ("a generic match").

If the result of the determination is that the generic component of the service provider ID sent from the reader terminal 101 matches the generic component of one of the service provider IDs stored on the mobile device 104, the mobile device 104, in turn, transmits to the reader terminal 101 the program IDs stored on the mobile device 104 that are associated with the one or more service provider IDs that are a generic match to the service provider ID sent from the reader terminal 101 (S206).

FIG. 3. is a flowchart further illustrating the steps for storing and managing program data. The mobile device 104 receives the service provider ID from the reader terminal 101 (S301). The service provider ID includes a generic component and a specific component. In turn, the mobile device 104 determines whether there is a match between the service provider ID from the reader terminal 101 and any of the service provider IDs stored on the mobile device 104 (S302). If it is determined that there is a match, the mobile device 104 transmits the program data stored on the mobile device 104 that is associated with the one or more service provider IDs stored on the mobile device 104 that match the service provider ID received from the reader terminal 101 (S303).

If it is determined that there is no match, the mobile device 104 determines whether the generic component of the service provider ID received from the reader terminal 101 matches a generic component of one of the service provider IDs stored on the mobile device 104 (S304). If it is determined that there is a generic match, the mobile device 104 transmits the program data stored on the mobile device 104 that is associated with the one or more service provider IDs stored on the mobile device 104 whose generic components matched the generic component of the service provider ID received from the reader terminal 101 (S305). If it is determined that is no generic match, the process ends (S306).

As discussed above, by making successive determinations, first of whether there is a match and second of whether there is a generic match, the mobile device 104 can make quick and efficient selection of program data that can be applied to a service transaction and can effectively apply program data to a transaction based on a generic association to a service provider.

Example Computer-Readable Medium Implementations

The example embodiments described above, such as the systems and procedures depicted in or discussed in connection with FIGS. 1-3 or any part or function thereof, may be implemented by using hardware, software or a combination of the two. The implementation may be in one or more computers or other processing systems. While manipulations performed by these example embodiments may have been referred to in terms commonly associated with mental operations performed by a human operator, no human operator is needed to perform any of the operations described herein. In other words, the operations may be completely implemented as machine operations. Useful machines for performing the operation of the example embodiments presented herein include general-purpose digital computers or similar devices.

Figure 4:
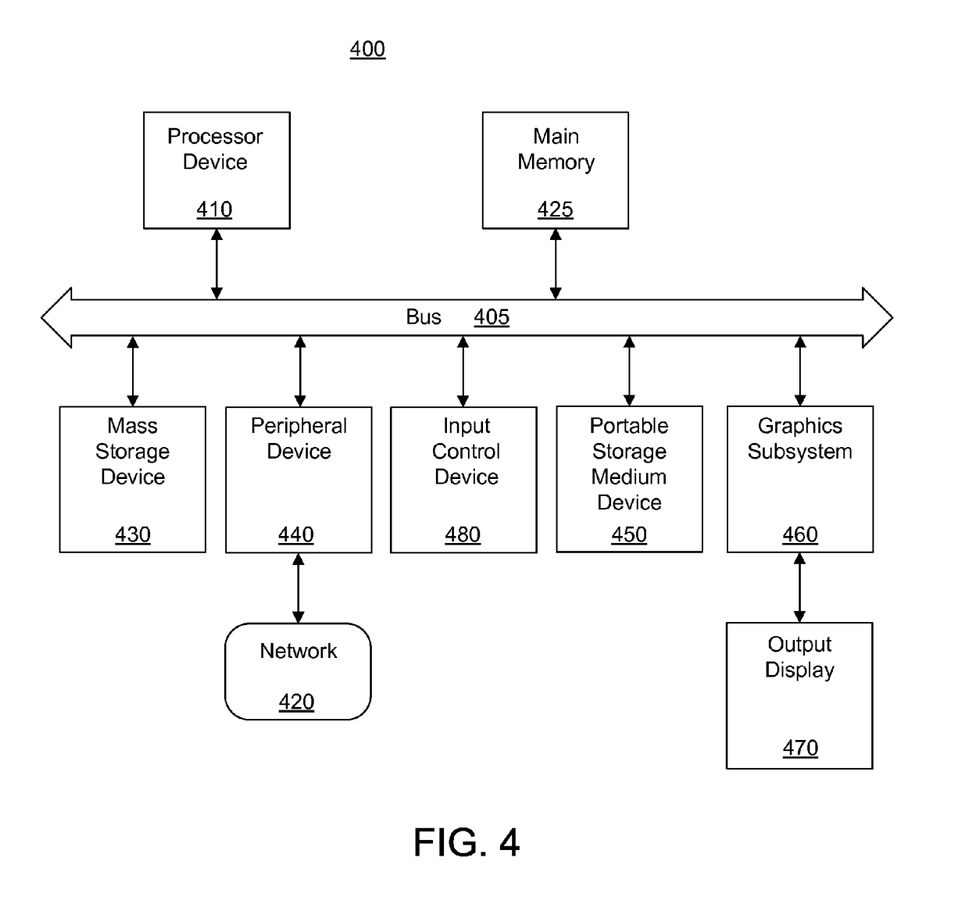
FIG. 4 is a block diagram of a general or special purpose computer.

FIG. 4 is a block diagram of a general and/or special purpose computer 400 that may be employed in accordance with various example embodiments herein. The computer 400 may be, for example, a user device, a user computer, a client computer, and/or a server computer, among other things.

The computer 400 may include without limitation a processor device 410, a main memory 425, and an interconnect bus 405. The processor device 410 may include without limitation a single microprocessor, or may include a plurality of microprocessors for configuring the computer 400 as a multi-processor system. The main memory 425 stores, among other things, instructions and/or data for execution by the processor device 410. The main memory 425 may include banks of dynamic random access memory (DRAM), as well as cache memory.

The computer 400 may further include a mass storage device 430, peripheral device(s) 440, portable storage medium device(s) 450, input control device(s) 480, a graphics subsystem 460, and/or an output display 470. For explanatory purposes, all components in the computer 400 are shown in FIG. 4 as being coupled via the bus 405. However, the computer 400 is not so limited. Devices of the computer 400 may be coupled via one or more data transport means. For example, the processor device 410 and/or the main memory 425 may be coupled via a local microprocessor bus. The mass storage device 430, peripheral device(s) 440, portable storage medium device(s) 450, and/or graphics subsystem 460 may be coupled via one or more input/output (I/O) buses. The mass storage device 430 may be a nonvolatile storage device for storing data and/or instructions for use by the processor device 410. The mass storage device 430 may be implemented, for example, with a magnetic disk drive or an optical disk drive. In a software embodiment, the mass storage device 430 is configured for loading contents of the mass storage device 430 into the main memory 425.

The portable storage medium device 450 operates in conjunction with a nonvolatile portable storage medium, such as, for example, a compact disc read only memory (CD-ROM), to input and output data and code to and from the computer 400. In some embodiments, the software for storing an internal identifier in metadata may be stored on a portable storage medium, and may be inputted into the computer 1900 via the portable storage medium device 450. The peripheral device(s) 440 may include any type of computer support device, such as, for example, an input/output (I/O) interface configured to add additional functionality to the computer 1900. For example, the peripheral device(s) 440 may include a network interface card for interfacing the computer 400 with a network 420.

The input control device(s) 480 provide a portion of the user interface for a user of the computer 400. The input control device(s) 480 may include a keypad and/or a cursor control device. The keypad may be configured for inputting alphanumeric characters and/or other key information. The cursor control device may include, for example, a mouse, a trackball, a stylus, and/or cursor direction keys. In order to display textual and graphical information, the computer 400 may include the graphics subsystem 460 and the output display 470. The output display 470 may include a cathode ray tube (CRT) display and/or a liquid crystal display (LCD). The graphics subsystem 460 receives textual and graphical information, and processes the information for output to the output display 470.

Each component of the computer 400 may represent a broad category of a computer component of a general and/or special purpose computer. Components of the computer 400 are not limited to the specific implementations provided here.

Portions of the example embodiments of the invention may be conveniently implemented by using a conventional general-purpose computer, a specialized digital computer and/or a microprocessor programmed according to the teachings of the present disclosure, as is apparent to those skilled in the computer art. Appropriate software coding may readily be prepared by skilled programmers based on the teachings of the present disclosure.

Some embodiments may also be implemented by the preparation of application-specific integrated circuits, field programmable gate arrays, or by interconnecting an appropriate network of conventional component circuits.

Some embodiments include a computer program product. The computer program product may be a storage medium or media having instructions stored thereon or therein which can be used to control, or cause, a computer to perform any of the procedures of the example embodiments of the invention. The storage medium may include without limitation a floppy disk, a mini disk, an optical disc, a Blu-Ray Disc, a DVD, a CD-ROM, a micro-drive, a magneto-optical disk, a ROM, a RAM, an EPROM, an EEPROM, a DRAM, a VRAM, a flash memory, a flash card, a magnetic card, an optical card, nanosystems, a molecular memory integrated circuit, a RAID, remote data storage/archive/warehousing, and/or any other type of device suitable for storing instructions and/or data.

Stored on any one of the computer-readable medium or media, some implementations include software for controlling both the hardware of the general and/or special computer or microprocessor, and for enabling the computer or microprocessor to interact with a human user or other mechanism utilizing the results of the example embodiments of the invention. Such software may include without limitation device drivers, operating systems, and user applications. Ultimately, such computer-readable media further includes software for performing example aspects of the invention, as described above.

Included in the programming and/or software of the general and/or special purpose computer or microprocessor are software modules for implementing the procedures described above.

As can be appreciated in view of the foregoing description, the example aspects herein provide a system, method, and computer-readable medium for storing and managing program data.

Unlike existing approaches to managing program data, which require extensive processing on the mobile device side in order to individually determine the compatibility of program data with a transaction, the example aspects described herein enable a more efficient approach in which program data can be applied to a transaction based on a mere generic association with a service provider.

Also, the example aspects described herein, unlike existing approaches, avoid the need for extensive processing on the terminal side by transmitting only the minimal compatible program data required to effect the transaction. The user's experience is thus greatly improved by increased processing efficiency and avoiding the need for manual user input.

While various example embodiments of the invention have been described above, it should be understood that they have been presented by way of example, and not limitation. It is apparent to persons skilled in the relevant art(s) that various changes in form and detail can be made therein. Thus, the invention should not be limited by any of the above described example embodiments, but should be defined only in accordance with the following claims and their equivalents.

In addition, it should be understood that the figures are presented for example purposes only. The architecture of the example embodiments presented herein is sufficiently flexible and configurable, such that it may be utilized and navigated in ways other than that shown in the accompanying figures.

Further, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the procedures recited in the claims need not be performed in the order presented.

What is claimed is:

1. A system to manage merchant-related program identifier data, comprising:
    a storage device comprising a secure element operable to store program data comprising a plurality of program identifiers, each of the program identifiers associated with a service provider identifier (ID), each service provider ID comprising a generic component of the servicer provider ID and a specific component of the servicer provider ID, the generic component and the specific component combining to form the service provider ID; and
    a processor communicatively coupled to the storage device, wherein the processor executes application code instructions that are stored in the storage device to cause the system to:
        receive a first service provider ID from a merchant computing device, the first service provider ID comprising a first generic component of the first service provider ID and a first specific component of the first service provider ID, the first generic component and the first specific component combining to form the first service provider ID;
        determine that the first service provider ID comprising both the first generic component and the first specific component received from the merchant computing device does not match one service provider ID associated with the plurality of program identifiers stored in the storage device;
        in response to determining that the first service provider ID comprising both the first generic component and the first specific component does not match one service provider ID associated with the plurality of program identifier stored in the storage device, compare the first generic component of the first service provider ID received from the merchant computing device to each generic component of each service provider ID associated with the program identifiers stored in the storage device;
        determine that the first generic component of the first service provider ID matches one generic component of one or more service provider identifiers associated with at least one of the plurality of program identifiers stored in the storage device;
        identify the at least one program identifier that comprises the one generic component of the one or more service provider identifiers that match the first generic component of the first service provider ID; and
        transmit the at least one identified program identifier to the merchant computing device, the at least one identified program identifier comprising the one generic component of the service provider identifiers that matches the first generic component of the first service provider ID.

2. The system of claim 1, wherein the generic component of the servicer provider ID identifies an enterprise, and wherein the specific component of the servicer provider ID identifies a brand.

3. The system of claim 1, wherein the generic component of the service provider ID is encoded in a first number of consecutive bytes of the service provider ID, and the specific component of the service provider ID is encoded in a second number of consecutive bytes of the service provider ID.

4. The system of claim 3, wherein the first number of consecutive bytes is equal to the second number of consecutive bytes.

5. The system according to claim 1, wherein the processor is further configured to execute computer-executable instructions stored in the storage device to cause the system to compare the first service provider ID received from the merchant computing device to each service provider ID associated with the plurality of program identifiers stored in the storage device.

6. A method to manage merchant-related program identifier data, comprising:
    storing, by a mobile computing device, program data comprising a plurality of program identifiers, each of the program identifiers associated with a service provider identifier (ID), each service provider ID comprising a generic component of the servicer provider ID and a specific component of the servicer provider ID; and receiving, by the mobile computing device, a first service provider ID from a merchant computing device, the first service provider ID comprising a first generic component of the first service provider ID and a first specific component of the first service provider ID, the first generic component and the first specific component combining to form the first service provider ID;

comparing, by the mobile computing device, the first service provider ID comprising both the first generic component and the first specific component received from the merchant computing device to each service provider ID associated with plurality of program identifiers stored by the mobile computing device;

determining, by the mobile computing device, that the first service provider ID comprising both the first generic component and the first specific component does not match one service provider ID associated with the plurality of program identifiers stored by the mobile computing device;

in response to determining that the first service provider ID comprising both the first generic component and the first specific component does not match one service provider ID associated with the plurality of program identifiers stored by the mobile computing device, comparing, by the mobile computing device, the first generic component of the first service provider ID received from the merchant computing device to each generic component of each service provider ID associated with the program identifiers stored by the mobile computing device;

determining, by the mobile computing device, that the first generic component of the first service provider ID matches one generic component of one or more service provider identifiers associated with the program identifiers stored by the mobile computing device;

identifying, by the mobile computing device, the at least one program identifier that comprises the one generic component of the one or more service provider identifiers that match the first generic component of the first service provider ID; and transmitting, by the mobile computing device, the at least one identified program identifier to the merchant computing device, the at least one identified program identifier comprising the one generic component of the service provider identifiers that matches the first generic component of the first service provider ID.

7. The method of claim 6, wherein the generic component of the servicer provider ID identifies an enterprise, and wherein the specific component of the servicer provider ID identifies a brand.

8. The method of claim 6, wherein the mobile computing device comprises a secure element that stores the program data.

9. The method of claim 6, wherein the generic component of the service provider ID is encoded in a first number of consecutive bytes of the service provider ID and the specific component of the service provider ID is encoded in a second number of consecutive bytes of the service provider ID.

10. The method of claim 9, wherein the first number of consecutive bytes is equal to the second number of consecutive bytes.

11. A non-transitory computer-readable medium, comprising:

computer-readable program instructions embodiment therein that when executed by a computer causes the computer to manage merchant-related program identifier data, the computer-readable program instructions comprising:

computer-readable program instructions to store program data in a secure memory, the program data comprising a plurality of program identifiers, each of the program identifiers associated with a service provider identifier (ID), each service provider ID comprising a generic component of the servicer provider ID and a specific component of the servicer provider ID, the generic component and the specific component combining to form the service provider ID; and computer-readable program instructions to receive a first service provider ID from a merchant computing device, the first service provider ID comprising a first generic component of the first service provider ID and a first specific component of the first service provider ID, the first generic component and the first specific component combining to form the first service provider ID;

computer-readable program instructions to determine that the first service provider ID comprising both the first generic component and the first specific component does not match one service provider ID associated with the plurality of program identifier stored in the secure memory;

computer-readable program instructions to, in response to determining that the first service provider ID comprising both the first generic component and the first specific component does not match one service provider ID associated with the plurality of program identifiers stored in the secure memory, determine that the first generic component of the first service provider ID matches one generic component of one or more service provider identifiers associated with the program identifiers stored in the secure memory;

computer-readable program instructions to identify the at least one program identifiers that comprise the one generic component of the one or more service provider identifiers that match the first generic component of the first service provider ID; and computer-readable program instructions to transmit the at least one identified program identifiers to the merchant computing device, the at least one identified program identifiers comprising the one generic component of the service provider identifiers that match the first generic component of the first service provider ID.

12. The computer program product of claim 11, wherein the generic component of the servicer provider ID identifies an enterprise, and wherein the specific component of the servicer provider ID identifies a brand.

13. The computer program product of claim 11, wherein the secure memory comprises a secure element.

14. The computer program product of claim 11, wherein the generic component of the service provider ID is encoded in a first number of consecutive bytes of the service provider ID and the specific component of the service provider ID is encoded in a second number of consecutive bytes of the service provider ID.

15. The computer program product of claim 14, wherein the first number of consecutive bytes is equal to the second number of consecutive bytes.

16. The computer program product of claim 11, further comprising computer-readable program instructions to compare the first service provider ID received from the merchant computing device to each service provider ID associated with the plurality of program identifiers stored in the memory.

17. The computer program product of claim 11, further comprising computer-readable program instructions to compare the first generic component of the first service provider ID received from the merchant computing device to each generic component of each service provider ID associated with the program identifiers stored by the memory.

* * * * *